United States Patent [19]

Humberto-Calderon-Quintero

[11] Patent Number: 4,715,880
[45] Date of Patent: Dec. 29, 1987

[54] TAKE OUT MECHANISM FOR GLASSWARE FORMING MACHINES

[75] Inventor: Miguel Humberto-Calderon-Quintero, San Nicolas de los Garza, Mexico

[73] Assignee: Vitro Tec Fideicomiso, Monterrey, Mexico

[21] Appl. No.: 808,355

[22] Filed: Dec. 11, 1985

[30] Foreign Application Priority Data

Dec. 14, 1984 [MX] Mexico .................................. 203757

[51] Int. Cl.⁴ ............................................. C03B 9/40
[52] U.S. Cl. ....................................... 65/260; 65/239; 65/241; 294/86.29; 294/110.1; 414/739
[58] Field of Search .................. 65/239, 241, 323, 260; 294/86.29, 110.1; 414/739

[56] References Cited

U.S. PATENT DOCUMENTS

| | | | |
|---|---|---|---|
| 1,805,815 | 5/1931 | Fitzpatrick | 294/86.29 X |
| 2,734,768 | 2/1956 | Warner | 294/86.29 |
| 3,362,545 | 1/1968 | Rowe | 65/260 |
| 4,004,835 | 1/1977 | Taylor | 294/86.29 |

FOREIGN PATENT DOCUMENTS

WO84/03500 9/1984 PCT Int'l Appl. .................. 65/260

*Primary Examiner*—Arthur Kellogg
*Attorney, Agent, or Firm*—Abelman Frayne Rezac & Schwab

[57] ABSTRACT

A take-out mechanism of particular utility in a glassware forming machine is provided by a ring-shaped member having pivotally mounted gripping fingers mounted on an inner periphery thereof, the gripping fingers being moveable between a retracted position in which they are positioned within the ring-shaped member, and an extended position for gripping relationship with an article, the ring-shaped member being vertically adjustable in position.

4 Claims, 5 Drawing Figures

TAKE OUT MECHANISM FOR GLASSWARE FORMING MACHINES

BACKGROUND OF THE INVENTION

The process of manufacturing glass articles utilizing paste mold machines has been known for many years.

In that process, a parison mold and a piston are used for forming a preform which is supported by a rotating crown.

A blow mold is then positioned around the preform or parison in order to provide for the final blowing of the desired shape of the article. After determined time, the blow mold is opened, and, the formed article of glassware is removed from the mold and is transferred to a cooling station.

The articles are then transported to a trimming machine in which excess ends of glass are removed, and, the trimmed articles are then placed on a conveyor belt which transports them to a tempering lehr.

After the article transfer stage, it is required that a take-out mechanism be provided, for removing the articles from the blow molds, and for transference of the blown articles to the trimming machine. These take-out mechanisms commonly include a tubular support containing an internal shaft which slides vertically in the tubular support by the action of a pneumatic cylinder. The shaft has a series of gripping fingers attached to one of its ends, the gripping fingers being employed to retain a formed article of glassware, and, then release it at the appropriate time.

One of the disadvantages of such mechanisms is that the handling of the articles is restricted to a single diameter of article. When articles are to be handled which have a greater or lesser diameter, then, it is necessary to change the gripping fingers in order to accommodate the different size of article.

Another disadvantage of known take-out mechanisms is that it is not possible to adjust the height of the take-out mechanism in order to accommodate articles of a differing height.

For this reason the take-out mechanisms of the prior art are far from satisfactory with respect to their versitility, since it is not possible for those mechanisms to handle different sizes of articles, and consequently, it is necessary to provide a specific take-out mechanism for each specific size of article.

SUMMARY OF THE INVENTION

A principal object of the invention is to provide a take-out mechanism for glassware forming machines which can handle articles of any diameter within a determined range of diameters, without requiring replacement or changing of the gripping fingers.

An additional object of the present invention is to provide take-out mechanisms for glassware forming machines which include an adjustable mechanism by means of which the closing diameter of the gripping fingers can be regulated, and so that the gripping fingers conform to the specific dimensions of a formed article.

A further object of the present invention is to provide a take-out mechanism for glassware forming machines, which provides for vertical adjustment of the positioning of the take-out mechanism, in order to accommodate formed articles of differing heights. Another object of the present invention is to provide a take-out mechanism for glassware forming machines, in which the gripping fingers of at least two take-out mechanisms can be operated simultaneously from a control common to both take-out mechanisms.

Another object of the present invention is to provide take-out mechanism for glassware forming machines which is simple in construction and relatively inexpensive to manufacture, and, which is highly efficient in its functioning.

According to the present invention, the take-out mechanism, which is of particular utility in glassware blowing machines, but limited to that usage, comprises a ring shaped member which is supported in an axially fixed position relative to an article to be removed from the machine, the ring shaped member incorporating gripping fingers which are pivotally mounted on the ring shaped member, and which are moveable between a retracted position in which they are positioned outwardly of an inner periphery of the ring shaped member, and, a gripping position in which they extend radially inwardly of the inner periphery of the ring shaped member and into gripping relationship with the article to be transported, the restrictive gripping fingers being operated by a rotatable crown ring carried by the ring shaped member, which includes surfaces for camming the gripping fingers into the radially inwardly extending position.

DESCRIPTION OF THE DRAWINGS

The invention will now be described with reference to the accompanying drawings, which illustrate preferred embodiments of the invention, and in which.

DETAILED DESCRIPTION OF THE INVENTION

Figure 1:
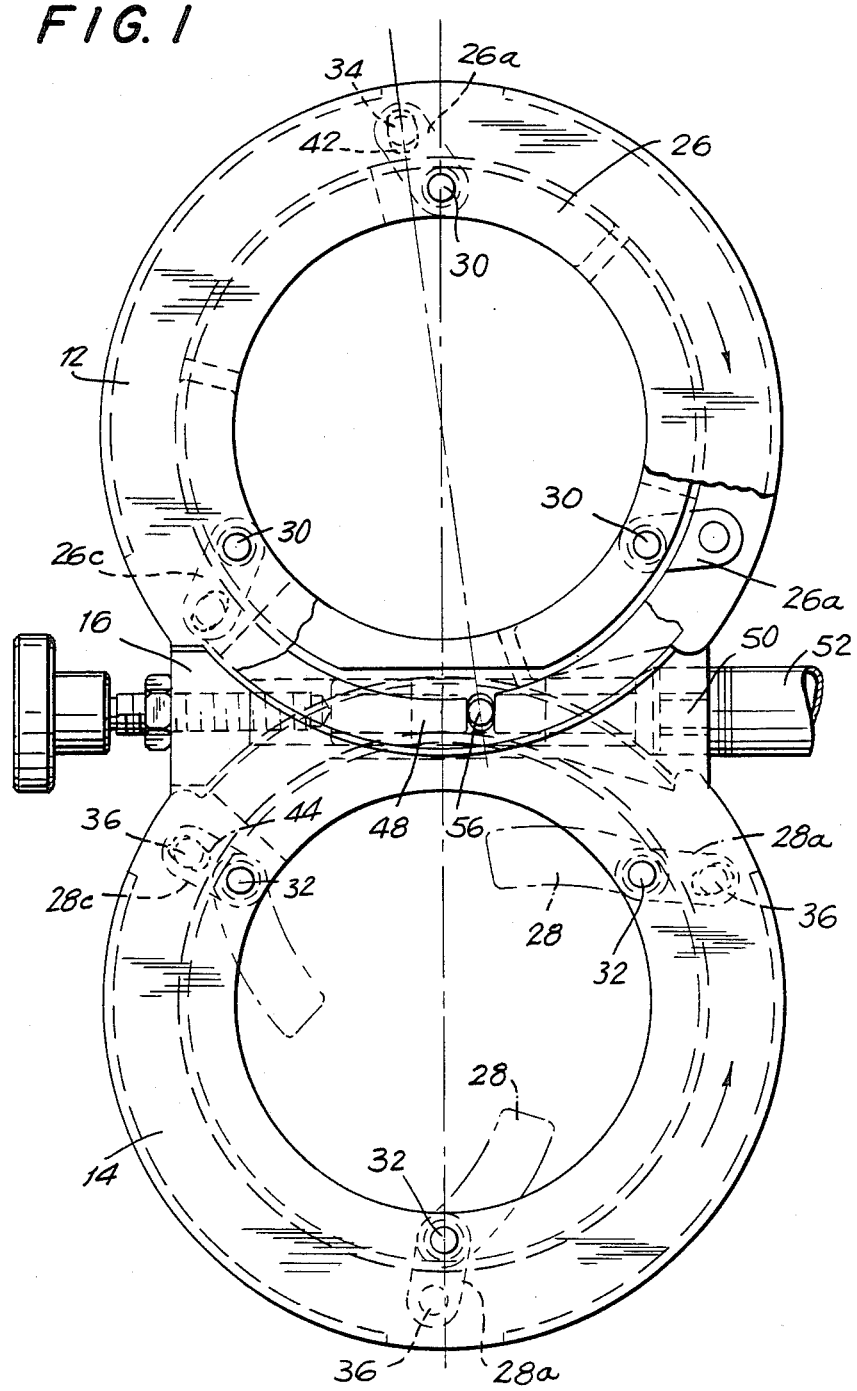
FIG. 1 is a plan view of a first embodiment of the present invention.
Figure 2:
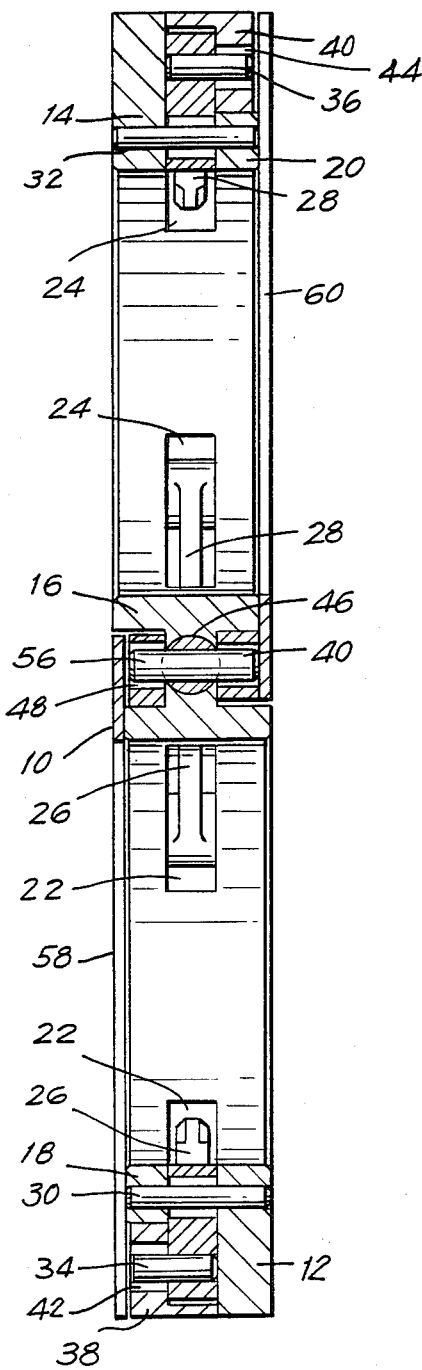
FIG. 2 is a cross-section taken through FIG. 1.

Referring now to FIGS. 1 and 2 of the drawings, the take-out mechanism includes a main frame comprised of two circular ring shaped members 12 and 14, which are integrally jointed to each other by a bridge member 16.

As more clearly shown in FIG. 2, each of the ring shaped members 12 and 14 is rabbited on its outer periphery to provide, essentially, a cylindrical core portion 18, 20, which proceeds into and is integral with a radially extending flange portion.

The radially extending flange portions are respectively positioned on opposite sides of the ring shaped members 12 and 14, such that the respective cylindrical cores 18, 20 extend in opposition directions from their associated flange portions.

Each cylindrical core member 18, 20 is provided with three radially extending slots 22, 24 arranged equidistantly about the inner circumference of the respective core members. Gripping fingers 26, 28 are positioned in the respective slots 22 and 24, the fingers 26 of the core member 20 being shown in a retracted position, and, the fingers 28 of the core member 18 shown in an extended position, in which they converge towards each other inwardly of core member 18 or 20 for gripping relationship with a neck of a blown glass article (not shown).

In FIG. 1, the respective gripping members 26 and 28 are shown in their normal retracted position in which they lie within the confines of the ring shaped member 12 and 14. In the lower portion of FIG. 1, the position of the gripping fingers 28, when in their extended position, is shown in chain dotted lines.

The respective gripping fingers 26 and 28 each are arcuate for them to recede completely into the associated ring member 12 and 14, and, they are each pivotally mounted on the associated ring shaped member by pivot pins 30 and 32 in order to permit such movement.

At their ends adjacent to the pivot pins 30, 32, the respective gripping fingers each are provided with an integral radially outwardly extending arm 25a, 28a, such that the respective gripping fingers are in the form of bell crank levers.

Extending through the arms 26a, 28a, and immoveably secure therein, are actuating pins 34 and 36 that extend parallel to the pivot pins 30, 32 for their ends to be positioned within radially elongate slots 42, 44, formed in a crown ring 38, 40 that is secured to the associated radially flange of the associated ring shaped member 12, 14 in a manner permitting rotation of the crown ring coaxially and concentrically on the associated core member 18, 20.

An illustrated, the crown rings 38 and 40 each are held on the associated ring members by plates 58, 60 which are attached directly to the core members 18, 20, for example, by means of screws (not shown).

In this manner, the crown rings are mounted for unconstrained rotation on the associated ring shaped members, the respective crown rings, 38, 40 as previously discussed, each being directly connected to the gripping fingers 26 and 28, by the pins 34 and 36 fast with the respective gripping members. Thus, rotation of the crown rings 38 and 40 in one direction will cause a retraction of the gripping fingers 26 and 28 into the core members 18 and 20, and, opposite rotation of the crown rings will cause the gripping fingers to move inwardly of the core members 18 and 20 and into gripping relationship with a blown glass article.

In order to provide for controlled rotation of the respective crown rings 38 and 40, whose rings are provided with a radially elongate slot 40 within which a pin 56 is freely moveable, in order that translations of the pin 56 along a line tangential to the respective crown ring will cause both of the crown rings to rotate, but, in opposite clockwise directions. By virtue of the inversion of one of the ring members 12, 14, relative to the other, translational movement of the pin 56 will cause all of the gripping fingers 26, 28 of both of the ring members 12, 14 to move in unison with each other either into extended gripping position, or, into retracted position.

The pin 56 is translatable along the said tangent within a slot provided in the bridge member 16, and, is translated along the path by a plunger 46 within which pin 56 is held captive. The pin 56 extends through the oppositely positioned radially elongate slots of the respective crown ring 38 and 40, such that the crown rings are moved in unison upon translation of the pin 56. The plunger 46 is moved in the appropriate opposite directions by means of a pneumatic or hydraulic actuator 52 having a piston section 50 connected to the plunger 46.

In order to limit travel of the plunger 46, and thus limit the extent of arcuate displacement of the crown rings 18 and 20, and thus the inward displacement of the gripping fingers 26 and 28, an adjustable stop member 54 is provided in the form of a threaded pin which extends into the bridge member 16 from the opposite side thereof, and axially into the path of travel of the plunger 46.

In this manner, movement of the plunger 46 can be accurately controlled, and in turn, the extent of inward displacement of the gripping fingers 26 and 28 can be accurately and predictably controlled for them to accommodate any selected diameter of formed glassware article within the range permitted by the internal diameter of the respective ring member 12 and 14.

Figure 5:
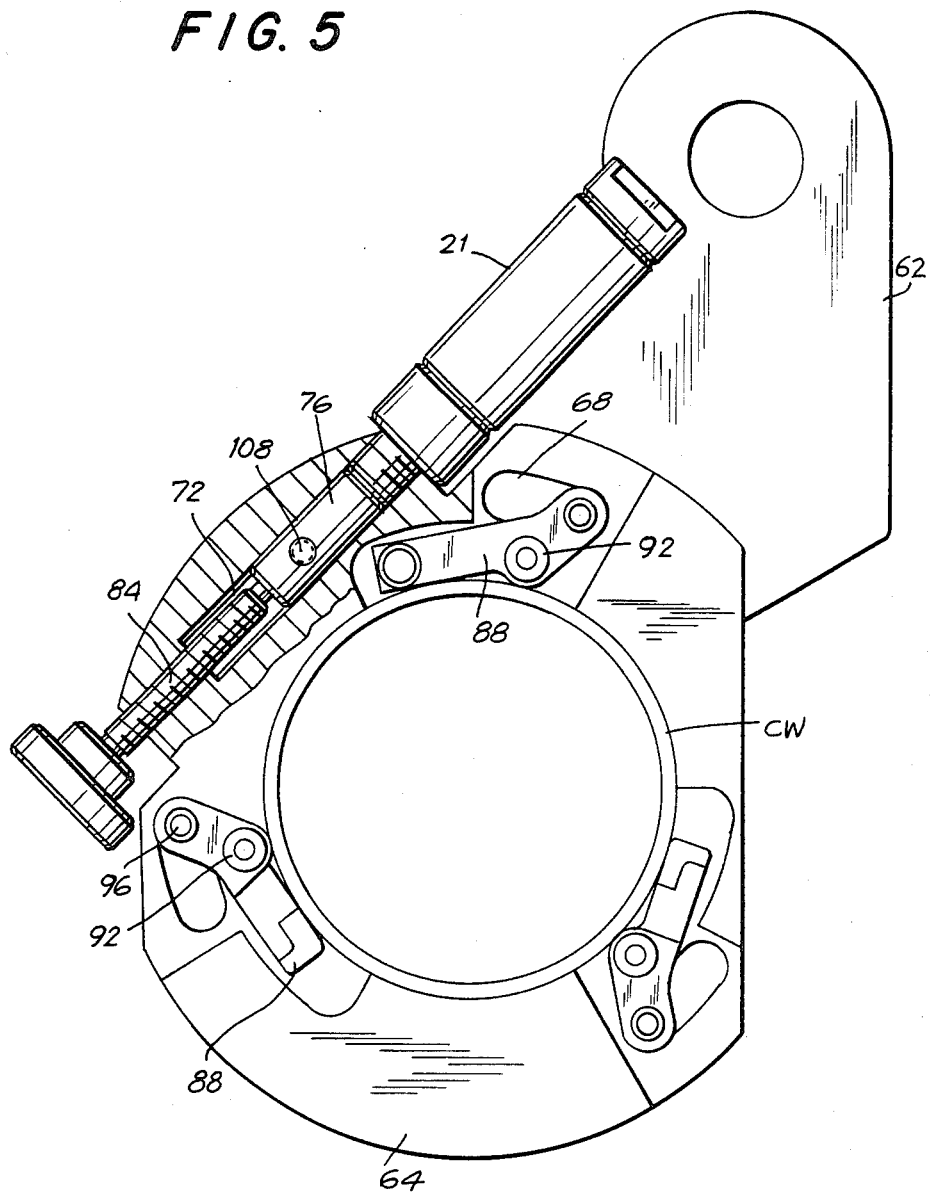

A minor modification of the FIG. 1 embodiment is illustrated in FIG. 5, in which the respective ring members are separate from each other, only one of the ring members being illustrated in FIG. 5.

The functioning of the embodiment of FIG. 5 is identical in all respects with that of the embodiment of FIGS. 1 and 2, with the exception that a separate actuator is provided for each of the ring members.

As will be seen, the ring shaped member 64 carries gripping fingers 88 which are pivoted on the ring shaped member by pivot pins 92, and which each include an actuating pin 96 for cooperation with a crown ring in the same manner as previously discussed.

Supported by the ring shaped member 64 is a hydraulic or pneumatic operator 21 having a plunger 76, which operates in a core 72 in the ring shaped member 64, the extent of axial movement of the plunger 76 being adjustable by a threaded screw 84. The plunger, in the same manner as the embodiment of FIGS. 1 and 2, includes a transverse pin 108 which extends into a radially elongate slot of the associated crown ring.

By providing a separate actuators for each of the take-out mechanisms, a plurality of such mechanisms can be mounted on a single support by means of a lug 64a fast with the ring shaped member 64. In this manner, the possibility of angular adjustment between respective pairs of take-out mechanism is provided, with the opportunity, for example, of mounting six such take-out mechanisms on a single support.

Figure 3:
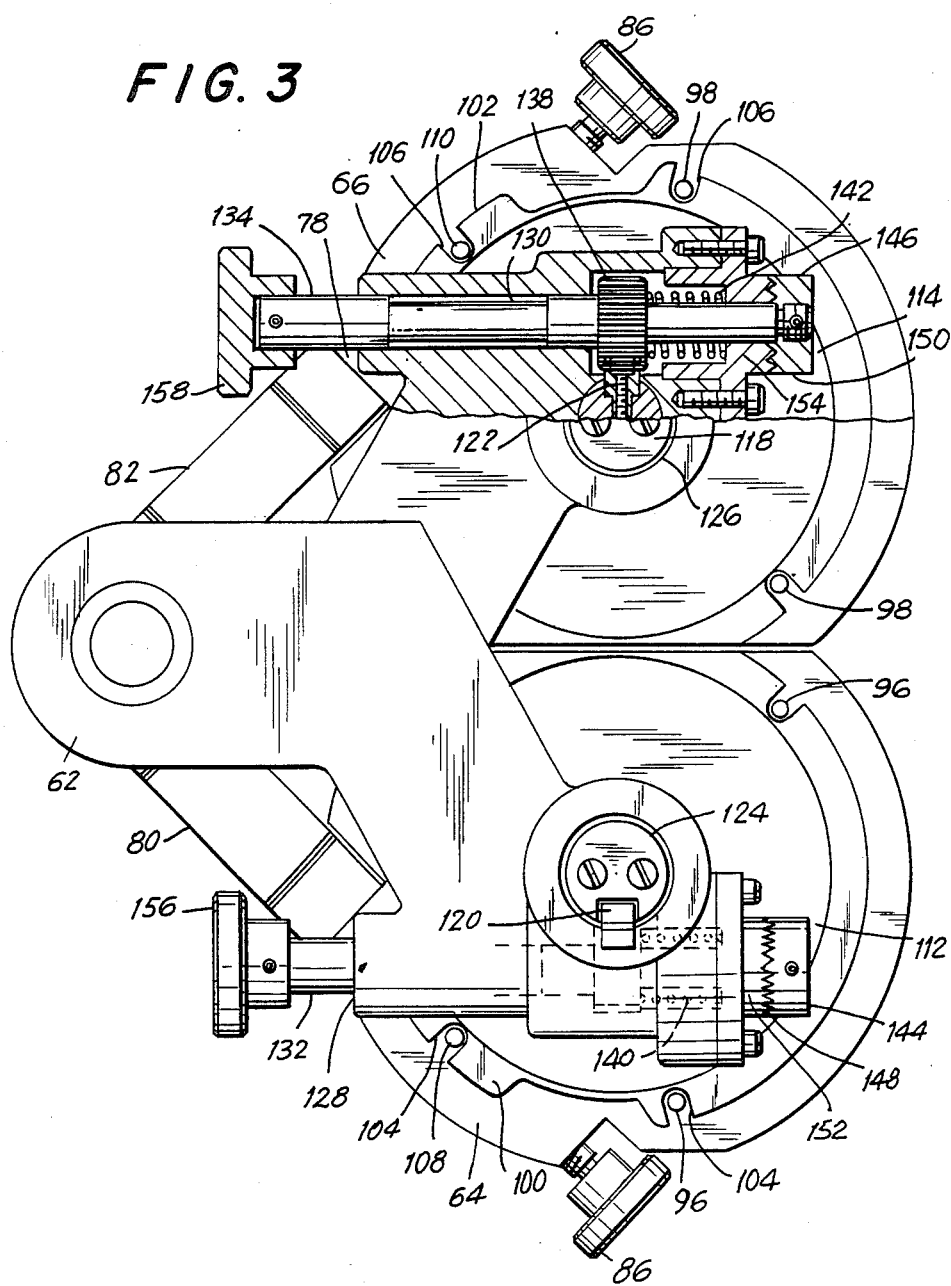
FIG. 3 is a plan view, partially cross-section of mechanisms for raising or lowering the take-out mechanisms of FIGS. 1 and 2.
Figure 4:
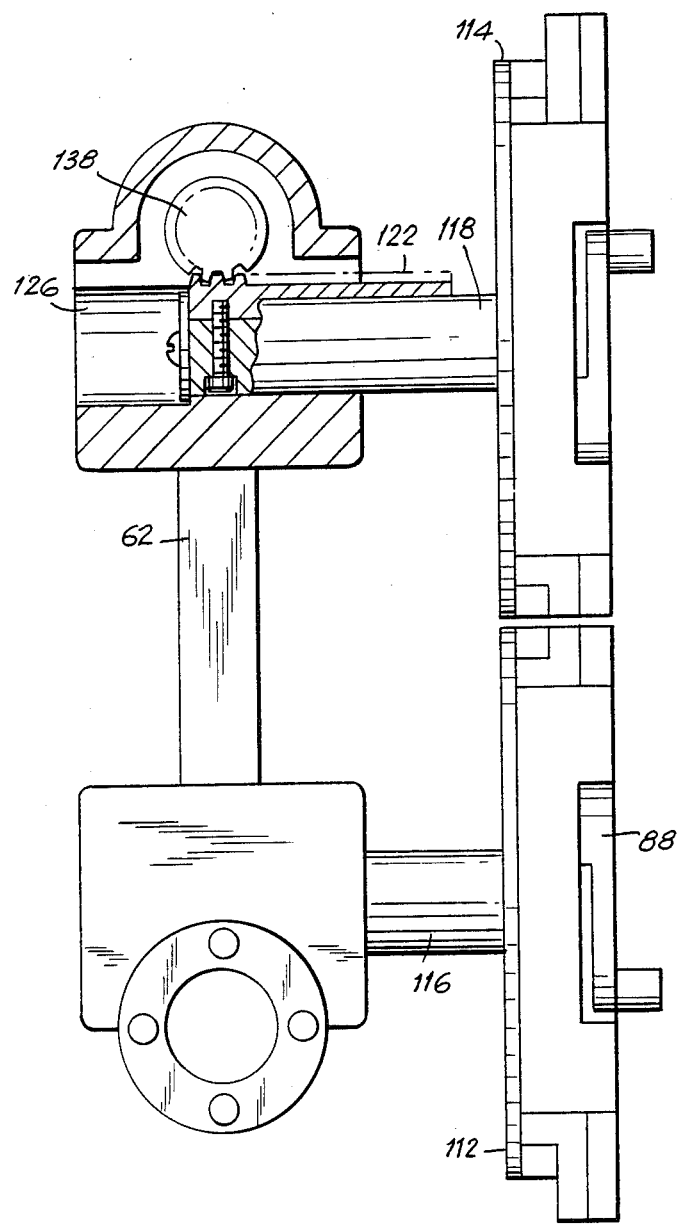
FIG. 4 is a side elevation of the structure of FIG. 3, again, shown partly in cross-section; and, FIG. 5 is a plan view, again, partially in cross-section, of an alternative embodiment of the take-out mechanism of the present invention.

A pair of such take-out mechanisms as described with reference to FIG. 5 is illustrated in FIGS. 3 and 4, FIG. 3 providing a plan view of the take-out mechanism of FIG. 5.

Referring now more particularly to FIG. 3, the respective take-out mechanisms, each are supported by a bracket 62, the respective take-out mechanisms including a ring-shaped member 64, 66, and a crown ring 100, 102. The crown rings are slotted as at 104, 106 in order to accommodate the pins 108, 110 associated with the respective hydraulic or pneumatic actuator 80, 82. As previously stated, the functioning of the embodiment of FIGS. 3 to 5 is identical in all respects with the functioning of the embodiments of FIGS. 1 and 2 in so far as actuation of the gripping fingers is concerned.

As is illustrated more particularly in FIGS. 3 and 4, each of the take-out mechanisms is provided with a means for adjusting the associated ring shaped member 64 or 66 in a vertical direction in order to accommodate formed glassware articles of differing heights.

This adjustment mechanism includes a manual control knob 156, 158 which is connected to rotate a spindle 132, 134, rotatable in a boss 128, 130 carried by the support bracket 62.

The respective spindles 132, 134 have spur sears 138 rigidly mounted thereon, and which are meshed with vertically extending racks 120 formed on posts 116, 118 by means of which the respective take-out mechanisms are supported.

Locks are provided for the respective spindles 132, 134 by dog tooth members 144, 146, the respective spindles 132, 134 being each moveable axially against the bias of a spring 142.

Thus, by moving the spindles 132, 134 axially against the bias of the associated spring 142, the dog tooth clutch member 146 is freed from the cooperating teeth 148 of the support members 152, 154 fast with the bosses 128, 130. Conveniently, cylindrical bearings 124, 126 are provided on posts carrying the respective ring-shaped members, and, which facilitate upwards or downward movements of the ring-shaped members under the control of the spur gears 138.

Having freed the respective spindles 132, 134 from their associated dog clutch members, then the respective spindles can be rotated by the hand wheels 156, 158 to in turn rotate the spur gears 138 in the desired direction, in turn, to raise or lower the associated take-out mechanism.

It will be understood that the embodiment of FIGS. 1 and 2, and, the embodiments of FIGS. 3 to 5 are preferred embodiments of the invention, and, that various modifications can be made without departing from the scope of the apended claims.

I claim:

1. A take-out mechanism of particular utility in a glassware forming machine, comprising:
    a ring-shaped member having an inner periphery of sufficient diameter to accomodate a formed glassware article;
    means supporting said ring-shaped member in axially fixed relationship to said formed article;
    gripping fingers pivotally mounted in horizontal position on said ring-shaped member and moveable between a retracted position in which they are positioned outwardly of said inner periphery of said ring-shaped member, and a gripping position in which they extend radially inwardly of said inner periphery of said ring-shaped member and into gripping relationship with a said article;
    a crown ring rotatable on said ring-shaped member for moving said gripping fingers between said retracted and extended positions, said crown ring having surfaces cooperating with pins carried by the respective said gripping members; and,
    an actuator connected to said crown ring and operative to rotate said crown ring through a determined angle to adjust the position of said gripping fingers radially inwardly and radially outwardly of the inner periphery of said ring-shaped member.

2. The mechanism of the claim 1, in which said gripping fingers are positioned equidistantly around said inner periphery of the associated said ring-shaped member.

3. The mechanism of claim 1, including two said ring-shaped members mounted in side-by-side relationship and united by a bridge member, said actuator being mounted on said bridge member and being connected to conjointly operate the respective said crown rings associated with each said ring-shaped member.

4. The mechanism of the claim 3, including an adjustable stop member carried by said bridge member for limiting movements of a moveable member of said actuator, and in turn for limiting inward displacement of said gripping fingers.

* * * * *